United States Patent [19]

Dejoie et al.

[11] 4,363,444
[45] Dec. 14, 1982

[54] MOBILE IRRIGATION BAR

[75] Inventors: Paul Dejoie, Labouheyre; Bernard Lamarque, Montesquieu, both of France

[73] Assignee: Perrot-France, Paris, France

[21] Appl. No.: 196,450

[22] Filed: Oct. 14, 1980

[30] Foreign Application Priority Data

Oct. 23, 1979 [FR] France ................... 79 26290

[51] Int. Cl.³ .................. B05B 3/02; B05B 3/18
[52] U.S. Cl. .................... 239/177; 239/184; 239/710; 239/711; 239/721; 239/DIG. 1
[58] Field of Search ............ 239/177, 183, 184, 191, 239/192, 710, 711, 718–721, DIG. 1

[56] References Cited

U.S. PATENT DOCUMENTS

| | | | |
|---|---|---|---|
| 2,711,615 | 6/1955 | Boice, Jr. ................. | 239/177 |
| 2,726,895 | 12/1955 | Behlen ................... | 239/720 |
| 3,578,244 | 5/1971 | Erickson ................. | 239/721 |
| 4,249,698 | 2/1981 | Smith et al. ............. | 239/177 |

FOREIGN PATENT DOCUMENTS 434918 11/1974 U.S.S.R. ................. 239/183
679187 8/1979 U.S.S.R. ................. 239/177

Primary Examiner—John J. Love
Assistant Examiner—Michael J. Forman
Attorney, Agent, or Firm—Fulwider, Patton, Rieber, Lee & Utecht

[57] ABSTRACT

The present invention relates to a mobile irrigation bar comprising a first connector means for supplying the bar, which is disposed at a first end of this bar, a second connector means which is disposed at the second end, and first and second main means for supporting the bar, disposed at the second and first ends and oriented so as to follow initial paths perpendicular to the bar, wherein the bar comprises first and second auxiliary means for supporting it on the ground, which are disposed near the second and first ends and which, in active configuration, are oriented to follow paths perpendicular to those of the main means, and a device for selecting the functioning of one pair of the support means from the following two pairs: first main means and second auxiliary means; second main means and first auxiliary means. One application of the invention is the irrigation of a strip of land of substantially constant width.

7 Claims, 8 Drawing Figures

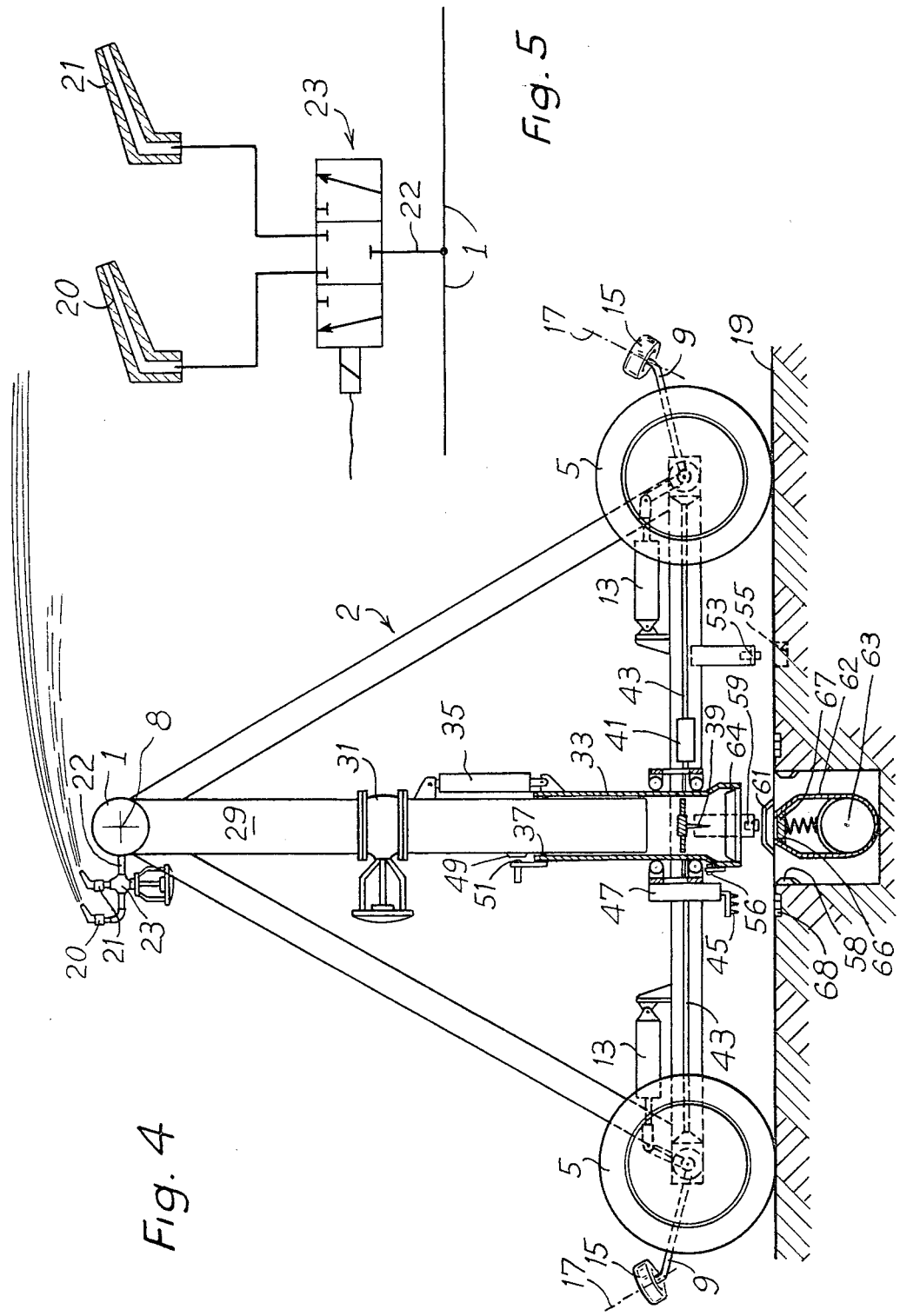

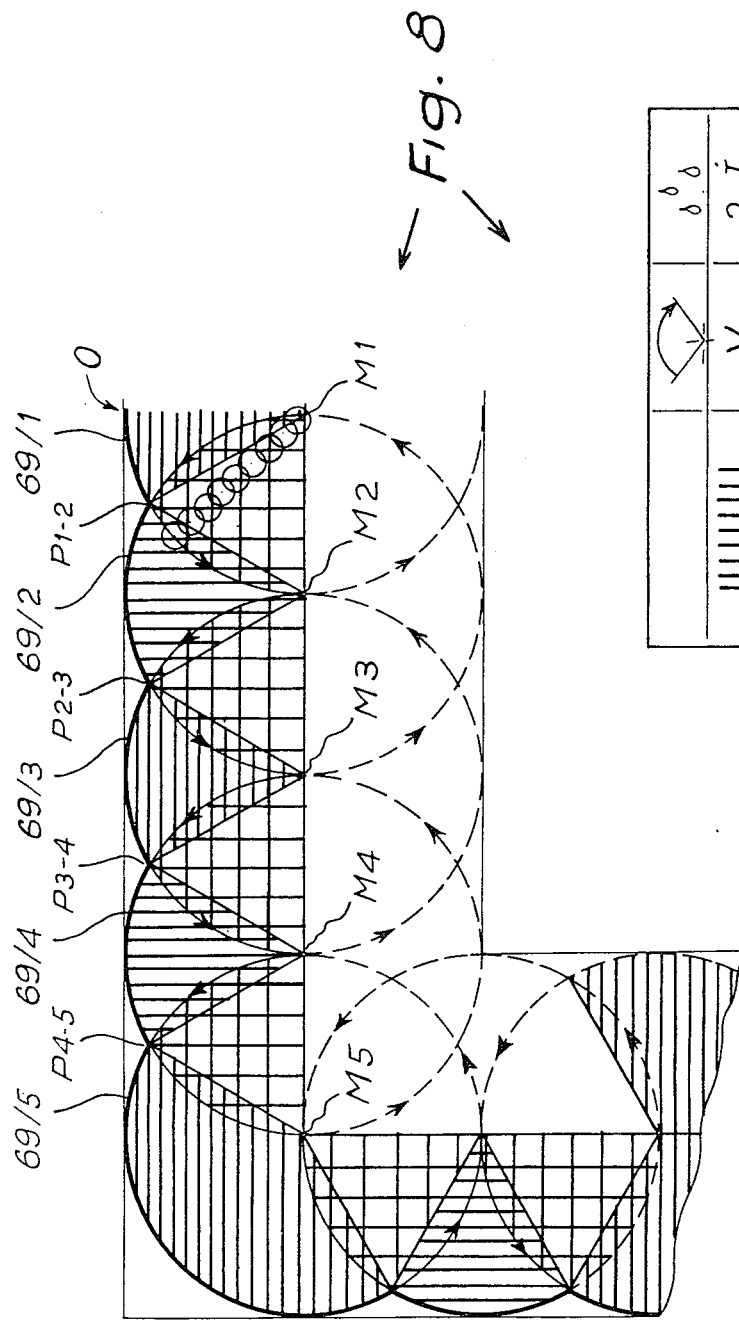

MOBILE IRRIGATION BAR

The present invention relates to a novel irrigation bar or tube which enables a strip of land of substantially constant width but of any form, to be irrigated efficiently and inexpensively.

The invention therefore relates to a mobile irrigation bar comprising:

a first connector means for connection to a water supply for the bar, which is disposed at a first of the two ends of this bar, a second connector means for connection to a water supply for the bar, which is disposed at the second end of the bar, a first main means for supporting and displacing the bar on the ground, which is disposed near said second end and which is oriented so as to follow an initial path perpendicular to the bar, and, in particular, to allow a displacement on the second end of the bar along a circumference of which the centre is constituted by said first connector means, and a second main means for supporting and displacing the bar on the ground, which is disposed near the first end and which is oriented to follow an initial path perpendicular to the bar and in particular to allow a displacement of the first end of this bar along a circumference of which the centre is constituted by said second connector means.

This bar further comprises:

first and second auxiliary means for supporting and displacing it on the ground, which are disposed near the second and first ends respectively and which, in support and displacement configuration, are oriented to follow paths which are initially perpendicular to those of said first and second main support and displacement means, respectively, and a device for selecting the functioning of one pair of the support and displacement means from the following two pairs;

first main means and second auxiliary means, together
second main means and first auxiliary means, together.

Furthermore, the following advantageous arrangements are often adopted:

the first and second main support and displacement means are mounted on the bar in a fixed position, whilst the first and second auxiliary support and displacement means are mounted on this bar so as to be retractable between an active support position and an inactive position in which they are not supported on the ground;

the first and second auxiliary support and displacement means are each disposed on arms mounted to pivot on the bar about axes parallel to this bar, whilst said arms are provided with devices for controlling their pivoting.

each device for controlling the pivoting of an arm is constituted by a jack coupled between the bar and this arm.

each of the first and second main support and displacement means is constituted by at least one wheel which, in support and displacement configuration, is mounted to rotate with respect to the bar about an axis parallel to this bar.

each of the first and second auxiliary support and displacement means is constituted by at least one wheel which, in support and displacement configuration, is mounted to rotate with respect to the bar about an axis at right angles to this bar.

the bar comprises a plurality of spray nozzles, which are grouped in pairs, the nozzles of each pair having different ranges of spraying and only one nozzle of each pair being capable of operating at a determined moment.

The invention will be more readily understood on reading the following description with reference to the accompanying drawings, in which:

FIG. 4 is a view in elevation of the other end frame of the bar of FIG. 1.

FIG. 5 is a diagram of the connection of the two nozzles of a pair of nozzles.

Figure 1:
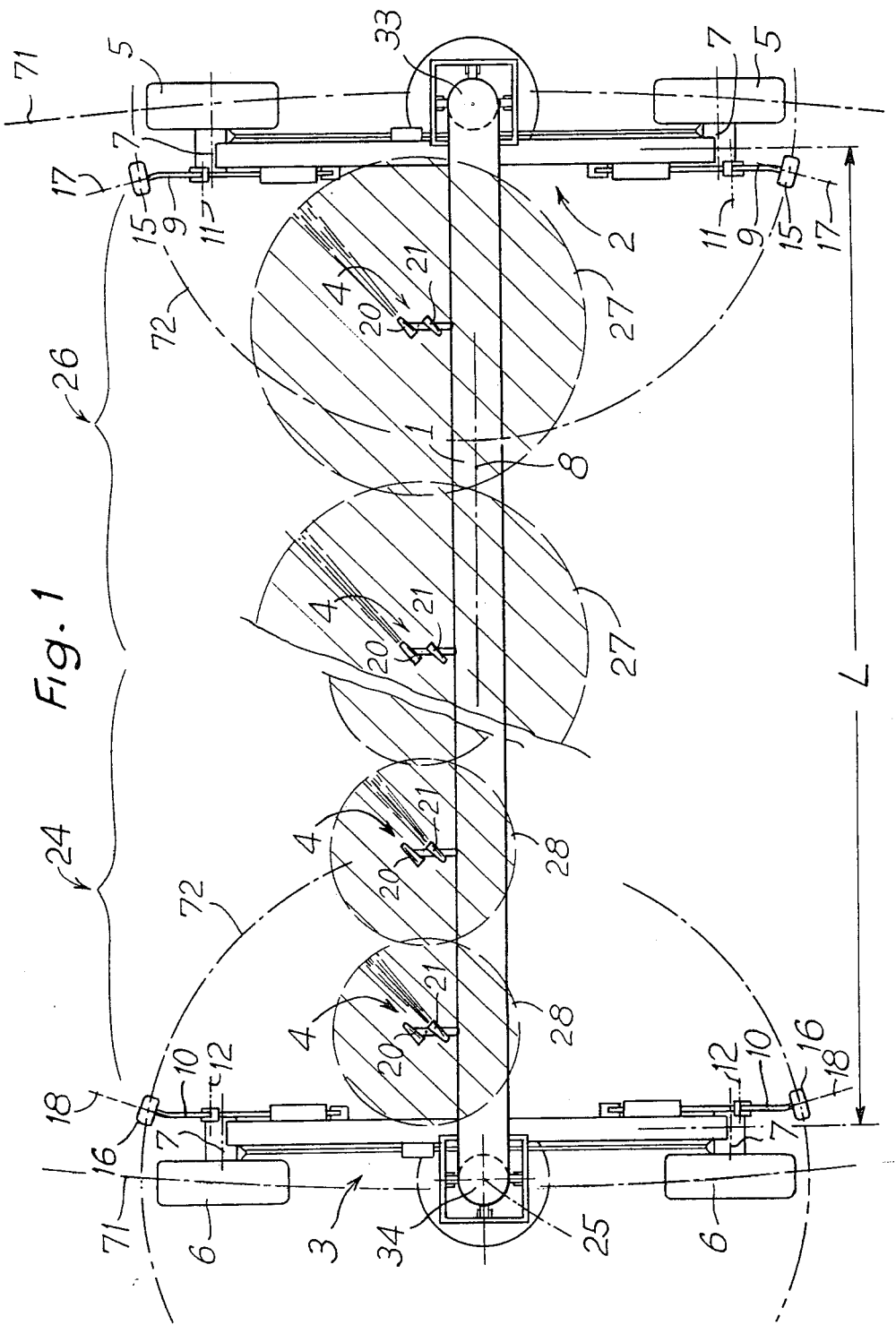
FIG. 1 is a plan view of a bar according to the invention.

Referring now to the drawings, the bar shown therein comprises:

a long rectilinear pipe 1 whose length is a function of the dimensions of the land to be irrigated, and is generally between 100 and 200 meters.

two end frames 2 and 3, and intermediate frames, not shown to render the drawing more clear, but known per se.

a plurality of pairs 4 of spray nozzles, distributed regularly along the pipe 1.

Each frame, and particularly the end frames 2 and 3, comprises a pair of wheels 5,6, respectively, which are mounted to rotate about axes 7 parallel to the horizontal axis 8 of the pipe 1. Moreover, each of the end frames 2,3 is provided with two arms 9,10 which are mounted to pivot about axes 11,12 also parallel to the axis 8 of the pipe 1, which are coupled to jacks 13,14 for controlling pivoting thereof, and of which the free ends support wheels 15,16 mounted to rotate about axes 17,18 at right angles to said axis 8 of the pipe 1, respectively.

Figure 2:
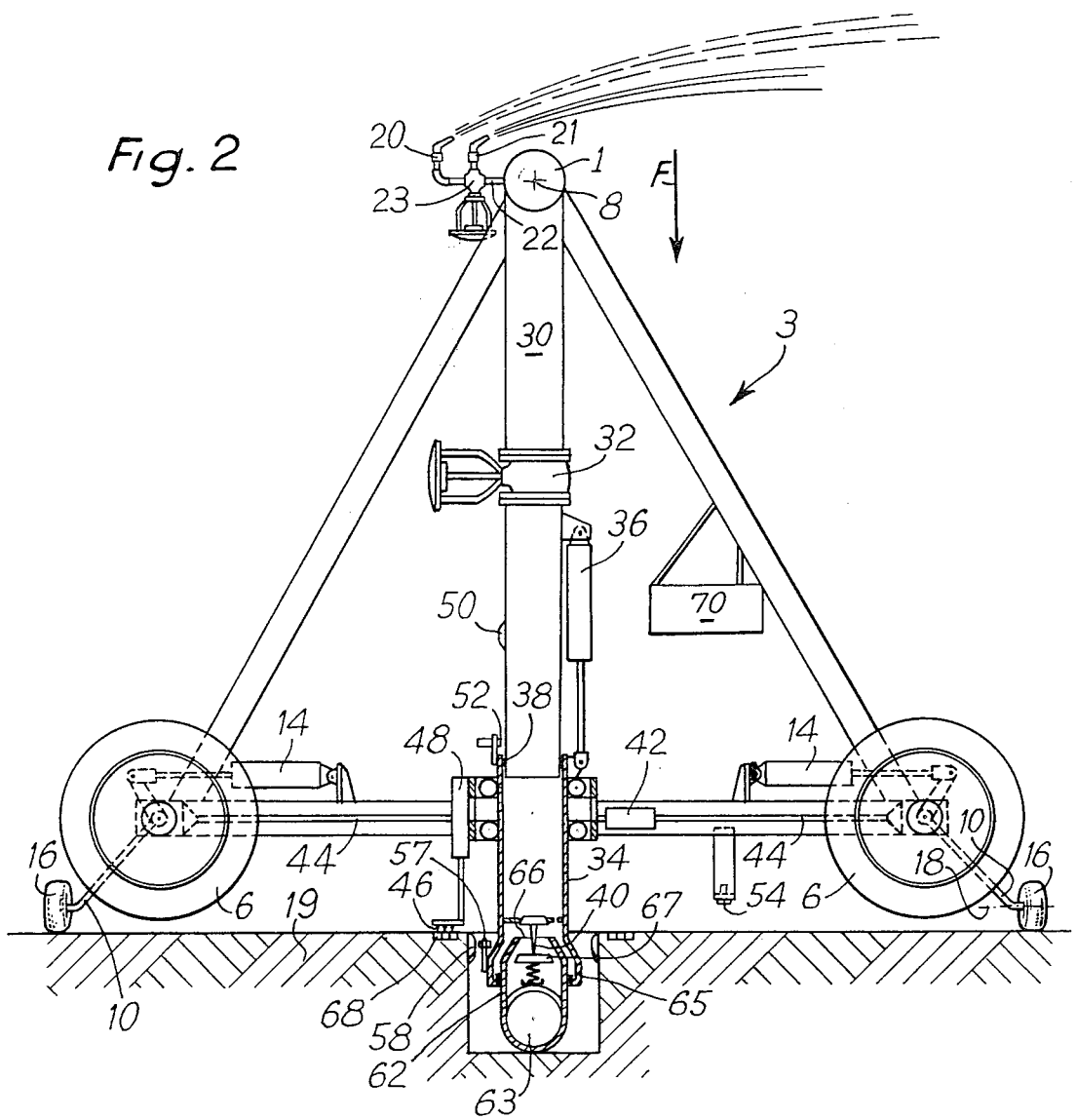
FIG. 2 is a view in elevation of one of the end frames of the bar of FIG. 1.
Figure 3:
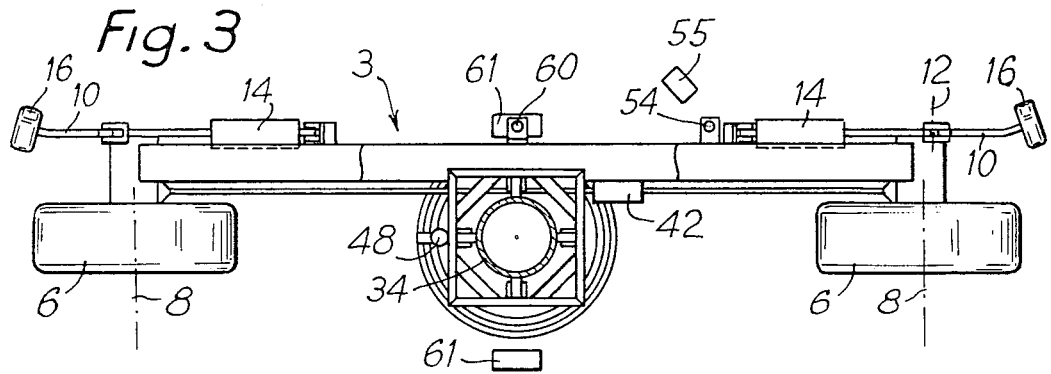
FIG. 3 is a view in the direction of arrow F of FIG. 2.

The pivoting of the arms 9,10 is such that, in a first extreme configuration, shown in FIGS. 2 and 3, the auxiliary wheels 16 rest on the ground 19 and their axes 18 are horizontal, the main wheels 6, on the contrary, not being supported on the ground, whilst, in a second extreme configuration shown in FIG. 4, the auxiliary wheels 15 are not supported on the ground 19, but the main wheels 5 rest thereon. It will be noted that, when the main wheels 5,6 of one of the end frames 2,3 are in abutment on the ground 19, it is the auxiliary wheels 16,15 of the other frame which are in abutment on the ground, respectively, and vice versa.

Concerning the nozzles 20 and 21 of the same pair 4, it will be noted that they are mounted on a pipe 22 connected to the pipe 1, a three-way electrovalve 23 being interposed between these nozzles and the pipe 1. The first of the three positions of the electrovalve 23 corresponds to the supply of the nozzle 20 via pipe 1 and to the non-supply of nozzle 21; the second, to the supply of nozzle 21 and the non-supply of nozzle 20; and, the third, to the non-supply of the two nozzles 20 and 21. In fact, nozzles 20 have spraying ranges and rates of flow greater than those of nozzles 21. The nozzles of one type are supplied: the nozzles 21 of a first part 24 of the bar, which extends from the centre of vertical pivoting 25 of this bar, and the nozzles 20 of the second part 26 of the bar, which extends from the end of the first part 24 to the frame 2 of the end of the bar opposite said centre of pivoting 25. Thus, the quantity of water sprayed along the pipe 1, proportional to the surface of the spraying circles 27,28 of the nozzles 20,21, is less over the surface covered by part 24 of the bar, than the quantity of water sprayed over the surface covered by the other part 26 of the bar, this being with equal spraying densities by the two types of nozzles.

The frames 2 and 3 are identical, but are disposed in distinct configurations. They respectively comprise:

a vertical pipe 29,30 connected to pipe 1, an electrovalve 31,32 for selectively closing this vertical pipe 29,30, a mobile vertical column 33,34 which is mounted for telescopic slide about the lower part of the vertical pipe 29,30, a jack 35,36 for adjusting the position of the column 33,34 coupled between the latter and the vertical pipe 29,30, a seal 37,38 disposed between the pipe and the column, a push member 39,40 fixed to the lower part of the telescopic column 33,34, an electric motor 41,42 for rotating the main wheels 5,6 coupled to said wheels by the shafts 43,44, brushes 45,46 for supplying electrical current, particularly to the drive motor 41,42, a jack 47,48 for lowering or lifting the brushes 45,46 with respect to the ground 19, and a plurality of probes and magnets:

a magnet 49,50 fixed on the vertical pipe 29,30, a probe 51,52 fixed on the telescopic column 33,34 and disposed opposite the magnet 49,50 when said column is in high position with respect to the ground (FIG. 4, probe 51 and magnet 49 of the frame 2), a probe 53,54 fixed to the frame 2,3 and adapted to detect magnets 55 flush with the ground surface 19 at certain sites which will be specified hereinafter, a probe 56,57, fixed to the lower part of the telescopic column 33,34 and disposed opposite magnets 58 flush with the ground surface at determined sites, when the column is in low position (cf. FIG. 2, probe 57).

a probe 59,60 fixed to the frame 2,3 and adapted to be disposed opposite magnets 61 disposed near hydrants 62 supplying pressurised water, distributed over the land to be irrigated.

The land to be irrigated is prepared to allow the bar to be supplied. This land, to be irrigated by means of the bar described, must have a substantially constant width 2L and consequently constitutes a strip of land of width 2L, which is not necessarily rectilinear. This width 2L is furthermore equal to double the length L of the bar used.

A pressurised water supply pipe 63 has been buried in this land, whilst a plurality of supply hydrants 62 are connected to this pipe 63, one being spaced apart from the following by a distance equal to the length L separating the lower openings 64,65 of the telescopic columns 33 and 34. Each hydrant 62 is surrounded by a concreted area which gives the frames 2 and 3 a satisfactory stability, making it possible to connect the lower openings 64,65 on said hydrants 62.

Each hydrant 62 is constituted by a section of vertical pipe whose opening 66 is directed upwardly. This opening 66 is normally closed by a spring-loaded valve 67, when the column 33,34 is in high position (such as column 33 of FIG. 4), whilst the push member 39,40 lifts said valve, when the column 33,34 is in low position (push member 40 in FIG. 2).

The land also comprises around each hydrant 62 a current collector ring 68 with which the brushes 45,46 of the frames 2,3, such as the brushes 46 of frame 3 (FIG. 2), may be placed in contact. Naturally, the magnets 61 are placed near the hydrants 62 to allow their proximity to be detected by means of the probes 59,60. Furthermore, the magnets 58 are disposed near the hydrants 62 and allow the connection of a telescopic column 33,34 on one of its hydrants to be detected.

According to the invention, the bar is connected to the successive hydrants 62 by one, then by the other of the telescopic columns 33,34 of its frames, the end of this bar opposite the one connected to a hydrant 62 describing an arc of circle. The various successive arcs of circle 69/1; 69/2; 69/3; 69/4; 69/5, etc ... are secant at points P1-2, P2-3, P3-4, P4-5, etc. which define the sites where the magnets 55 are disposed. It will further be noted that the various hydrants 62 are placed at successive points M1, M2, M3, M4, M5, etc ... and that the opening 64,65 of one of the telescopic columns 33,34 being connected to the hydrant 62 located at point M1, the column 34,33 of the other end of the bar is initially located at point O, origin of the irrigation, over a radius perpendicular to the axis of the pipe 63. The bar is rotated about the various points M1, M2, M3, M4, M5 successively, the arrows G marked on the arcs of circle defining the path directions of the end of the bar momentarily not connected by its telescopic column to the pipe 63.

The average speeds are not constant, but are equal either to a value V or to a value double the preceding one, viz. 2V, which, for a predetermined path in a determined direction, and for a likewise determined supply water pressure, corresponds to a rate of flow of delivered water equal either to a value 2I or to a value I, half of the preceding one.

Figure 6:
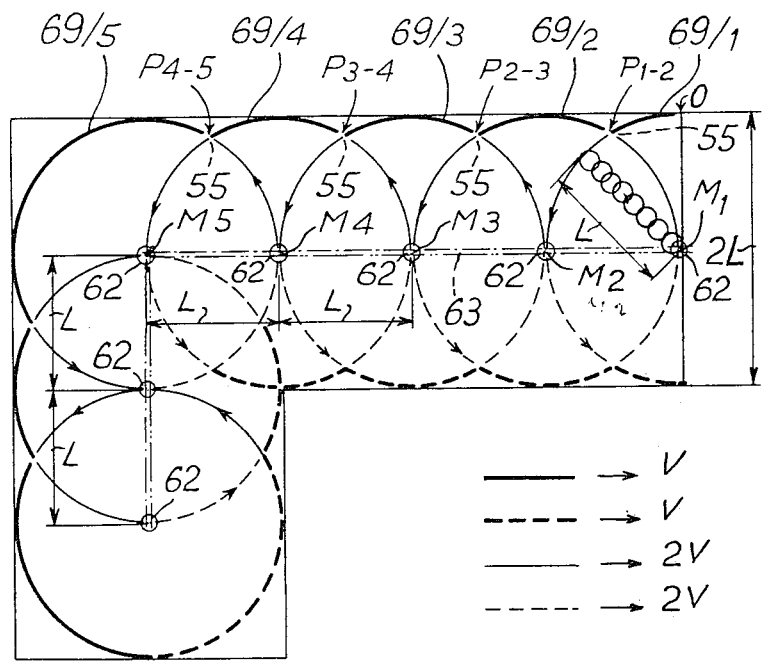
FIGS. 6 and 7 are diagrams of two different processes of irrigation, which use the bar of FIGS. 1 to 4, and FIG. 8 schematically shows the quantities of water distributed over the successive parcels of the land irrigated according to the process illustrated in FIG. 6.

According to the process shown in FIGS. 6 and 8, half the width L of the strip of land is firstly irrigated (path shown in solid lines), then the bar returns and automatically irrigates the other half (path shown in broken lines), also of width L.

Figure 7:
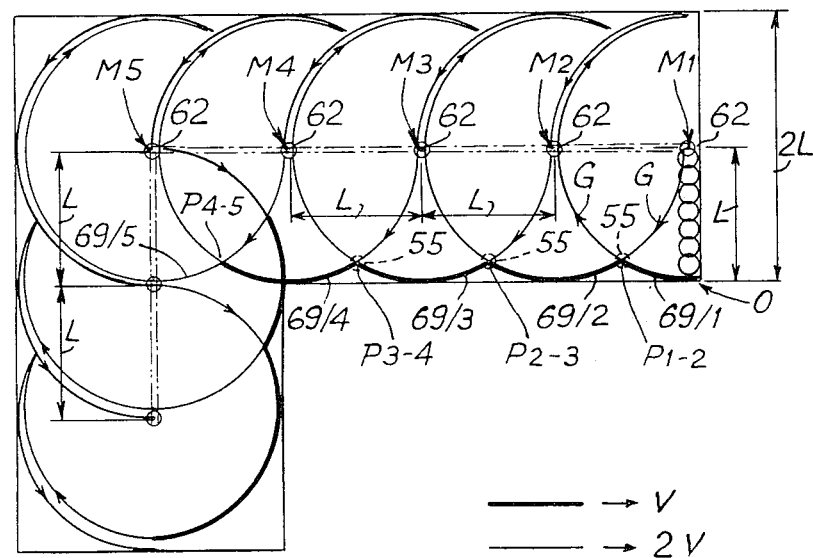

According to the process of FIGS. 6 and 8, or, according to the process of FIG. 7, the paths made at speed V are shown in thick lines, whilst the paths made at double speed 2V are shown in thinner lines.

The resulting irrigation has been shown diagrammatically in FIG. 8 by the use of hatchings of four types:

close together, vertical or horizontal, to represent the delivery of a flow of water 2I on a circular sector irrigated once (sectors M1 O P1-2; M2 P1-2 P2-3; M3 P2-3 P3-4; etc ... ) and spaced apart (twice as wide as the preceding ones), vertical or horizontal, to represent the delivery of a flow of water I over a circular sector which is, in fact, irrigated twice, and therefore irrigated by a total flow equal to 2I (sectors M1 P1-2M2; M2 P2-3M3, etc ... ) It will be noted that certain zones of small dimensions, limited by arcs of circle and by the chords which subtend them, are irrigated by a flow 3I. It remains that the average irrigation is made by a rate of flow 2I.

It is further specified that, to distinguish the paths made in opposite directions over circles 69-1; 69-2; 69-3, etc . . . according to the process of FIG. 7, two lines have been shown side by side, whilst, in fact, the opposite paths are made, following a single circle each time. Without it being necessary to describe the process of FIG. 7 in detail, it should nevertheless be noted, as will easily be deduced from observing this Figure, that the average irrigation is also made with a rate of flow 2I. The difference with respect to the preceding process of FIGS. 6 and 8 lies in the fact that the bar irrigates the strip of land directly in one forward passage over the whole of its width 2L.

The processes which have been described are advantageous, as, on the one hand, the land is irrigated over 97% of its surface, which is a figure much higher than those heretofore obtained, and, on the other hand, the bar is connected automatically and is also rotated automatically, due to the various probes and magnets which have been provided to a controller 70 to which these various probes are connected.

In fact, describing by way of example the succession of the phases of the process of FIGS. 6 and 8, the following train of operations is observed:

the opening 65 of the column 34 of the frame 3 is lowered onto the hydrant 62 located at M1, the opening 64 of the column 33 of the frame 2 being disposed, this column being in high position, above the origin O;

the push member 40 has opened the valve 67 of the hydrant 62 of point M1.

the auxiliary wheels 16 support the frame 3, describe a circle 72 and allow the rotation of its column 34 about the axis of the hydrant 62 of point M1, forming centre of pivoting 25 of the bar;

the brushes 46 are lowered and in contact with the collector ring 68;

the motor 41 drives the main wheels 5 of the frame 2 which describe a circle 71, centered at 25 (or, during this phase, M1) at the speed V, from 0 to P1-2;

the electrovalve 32 of the pipe 30 is open, allowing the pipe 1 to be supplied, whilst the electrovalve 31 of pipe 29 is closed;

the electrovalves 23 are controlled by the controller 70, informed by the probe 57 of the connection of the column 34, so as to supply the nozzles 21 at an average rate of flow in the part 24 of the bar, and to supply the nozzles 20 at a high rate of flow in the complementary part 26 of the bar;

when the frame 2 arrives near P1-2, its probe 53 detects the presence of the magnet 55 disposed at P1-2;

the information reaches the controller 70 which controls the speed of rotation 2V of the bar from P1-2 to M2;

the probe 59 of the frame 2 detects the proximity of the magnet 61 disposed near the hydrant 62 located at M2.

the controller 70, informed, stops the supply of electrical energy to the motor 41 and controls the lowering of the column 33, the brushes 45, and the positioning of the auxiliary wheels 15;

the probe 56 arriving opposite the magnet 58 controls the stopping of the descent of the column 33, the opening of the electrovalve 31, the selection, the reverse of the preceding, of the nozzles 20,21, the closure of the electrovalve 32, the rise of the column 34, the rise of the brushes 46, the reacting of the auxiliary wheels 16 and, again, the rotation of the bar, but this time by means of the motor 42 of frame 3, firstly at speed 2V, to cause the new free end of the bar (frame 3) to cover the arc of circle centered at M2, going from M1 to P1-2.

The subsequent operations are simply a repetition of those which have just been set forth.

By relatively simple, but novel means, this bar may thus be supplied equally well by either of its two ends, and the irrigation of a strip of land may be entirely automated, the passage of the frames supporting the bar causing minimum damage to the crops.

The invention is not limited to the description which has just been given but covers on the contrary all the variants that may be made thereto without departing from the scope thereof.

What is claimed is:

1. A mobile irrigation bar displaceable on a ground surface, said mobile irrigation bar having at least one inlet section being coupled to a water supply and at least one outlet section for passage of fluid external of said mobile irrigation bar, comprising:

first connector means for coupling said bar to said water supply, said bar having a pair of opposing ends, said first connector means being located at a first end of said bar;

second connector means for coupling said bar to said water supply, said second connector means being located at a second end of said bar;

first displacement means for supporting and displacing said bar on said ground surface, said first displacement means being located near said second end of said bar, said first displacement means being oriented to follow an initial path perpendicular to an extended length between said first and second ends of said bar for displacement of said second end of said bar along a circumference having a center constituted by said first connector means;

second displacement means for supporting and displacing said bar on said ground surface, said second displacement means being located near said first end of said bar, said second displacement means being oriented to follow said initial path perpendicular to said extended length between said first and second ends of said bar for displacement of said first end of said bar along a circumference having a center constituted by said second connector means;

first and second auxiliary displacement means for supporting and displacing said bar on said ground surface, said first and second auxiliary displacement means being respectively located near said second and first ends of said bar, said first and second auxiliary displacement means being oriented to follow paths which are substantially perpendicular to said paths of said first and second displacement means respectively; and, means for selective actuation of (1) said first displacement means and said second auxiliary displacement means, and (2) said second displacement means and said first auxiliary means.

2. The mobile irrigation bar as recited in claim 1 where said first and second displacement means are mounted on said bar in fixed position, said first and second auxiliary displacement means being retractably mounted to said bar for movement of said first and second auxiliary displacement means to (1) an active support position where said first and second auxiliary displacement means are contiguous said ground surface, and, (2) an inactive position where said first and second auxiliary displacement means are removed from said ground surface.

3. The mobile irrigation bar as recited in claim 2 where said first and second auxiliary displacement means are disposed on arm members pivotally coupled to said bar about axes parallel to said extended length between said first and second ends of said bar including means for controlling pivoting of said arm members.

4. The mobile irrigation bar as recited in claim 3 where said means for controlling pivoting of said arm members includes a respective jack coupled between each arm member and said bar.

5. The mobile irrigation bar as recited in claim 1 where each of said first and second displacement means includes at least one wheel member which is rotatable with respect to said bar about an axis substantially parallel to said extended length between said first and second ends of said bar.

6. The mobile irrigation bar as recited in claim 1 where each of said first and second auxiliary displacement means includes at least one auxiliary wheel member which is rotatable with respect to said bar about an axis substantially perpendicular to said extended length between said first and second ends of said bar.

7. The mobile irrigation bar as recited in claim 1 including a plurality of spray nozzles coupled in fluid relation to said outlet section, said spray nozzles being grouped in pairs, said spray nozzles of each pair having a different spray range and only one nozzle of each pair of nozzles operable at a predetermined time.

* * * * *